March 10, 1931.   P. B. KELLOGG   1,795,864
CONTROL VALVE FOR HOT AIR REGISTERS
Filed Aug. 7, 1928   2 Sheets-Sheet 1
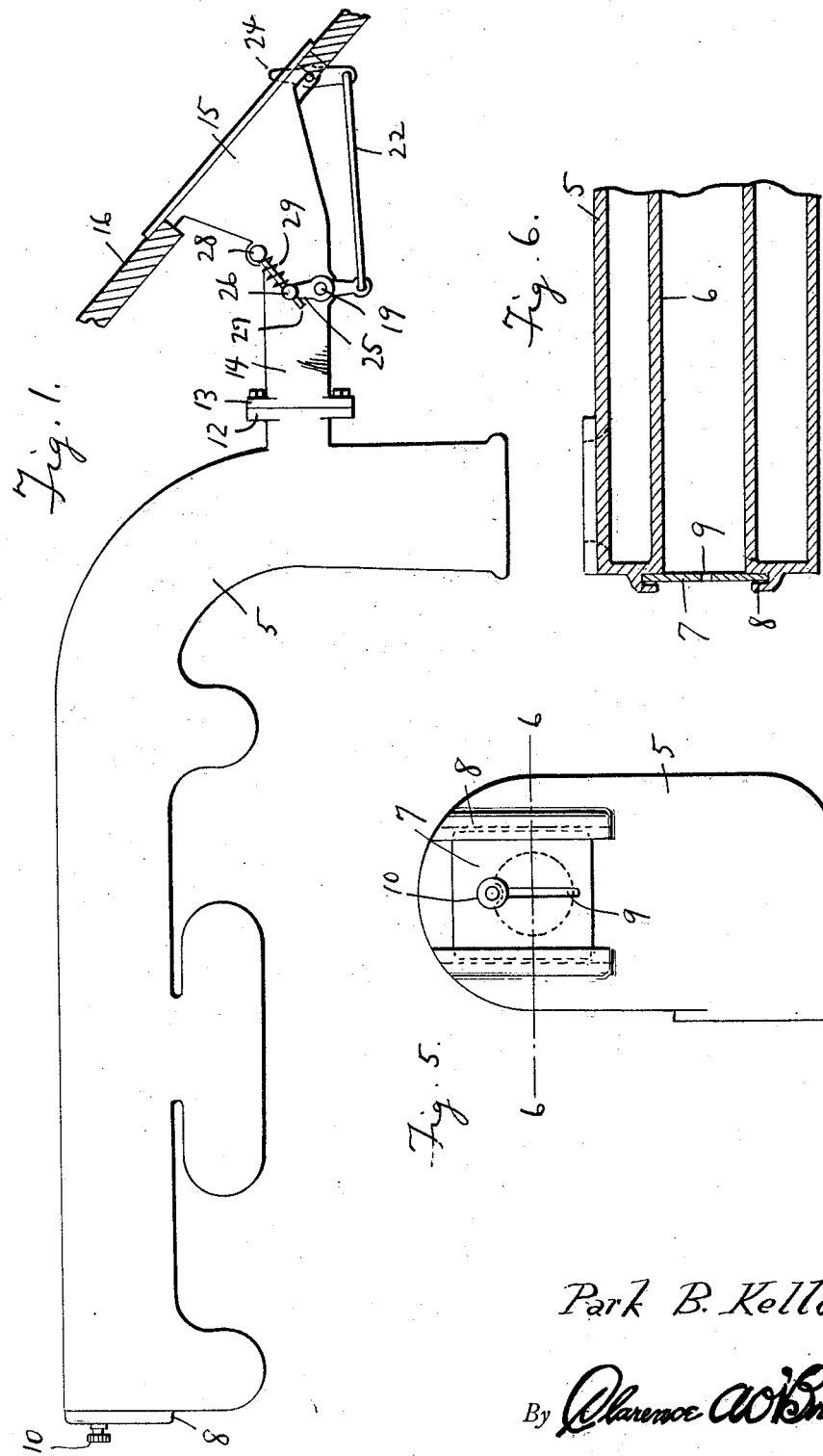
Inventor
Park B. Kellogg
By Clarence A. O'Brien
Attorney

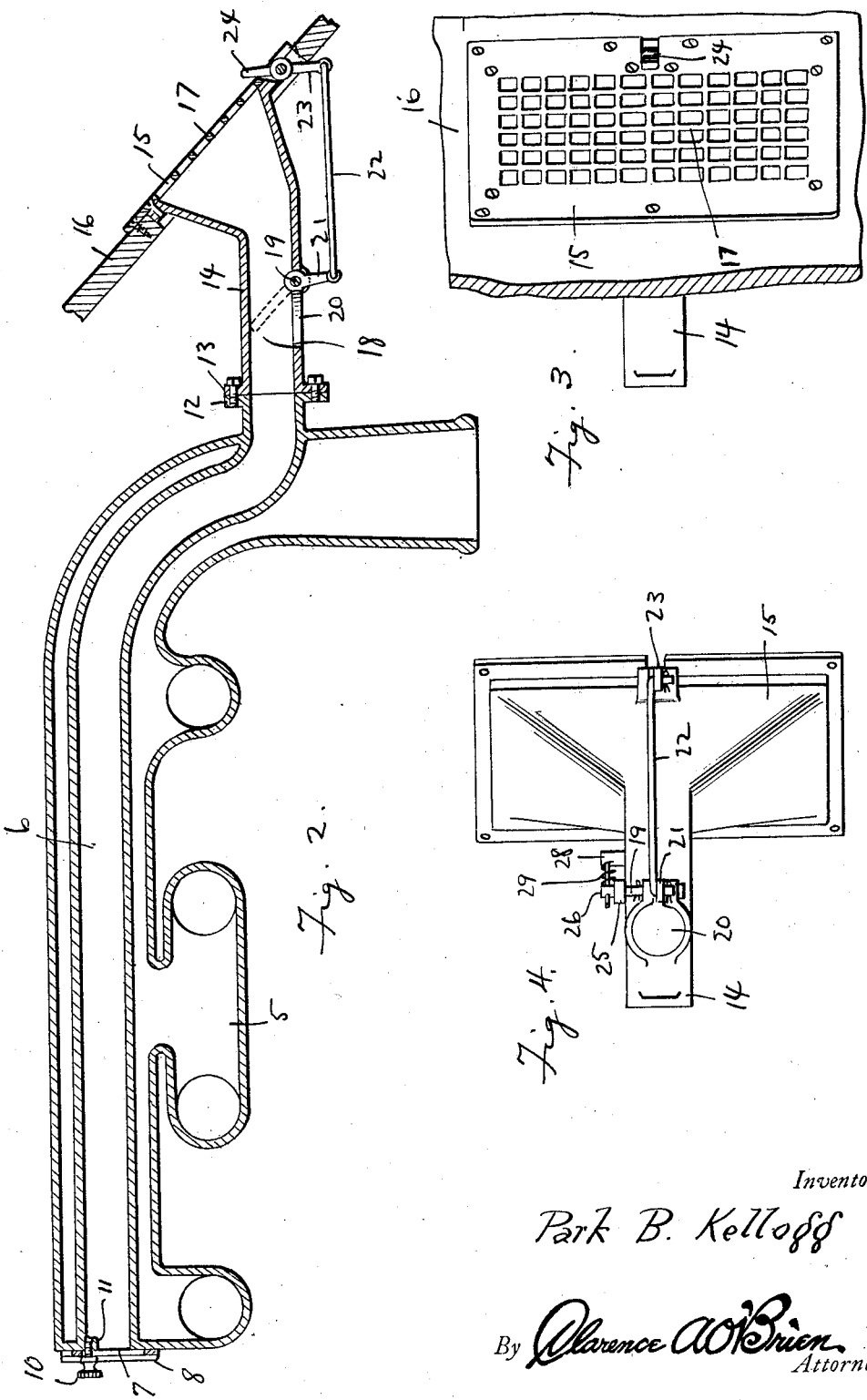

Patented Mar. 10, 1931

1,795,864

UNITED STATES PATENT OFFICE

PARK BUEL KELLOGG, OF STOCKTON, KANSAS

CONTROL VALVE FOR HOT AIR REGISTERS

Application filed August 7, 1928. Serial No. 298,103.

The present invention relates to heaters for automobiles and similar vehicles and has for its principal object to provide an air pipe extending through the exhaust manifold of the engine of the automobile for supplying heated air to the interior of the automobile.

An important object of the invention is to provide air control means at each end of the pipe for controlling the amount of cold air fed into the pipe to be heated by the manifold and also to control the amount of heated air discharged from the pipe into the body of the automobile.

A still further important object is to provide a device of this character of a simple and practical construction, which is efficient and reliable in performance, which may be easily and quickly installed in operative position upon the automobile and otherwise well adapted to the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a side elevational view of the invention in assembled position,

Figure 2 is a longitudinal sectional view through the exhaust manifold and heater, Figure 3 is a fragmentary top plan view of the hot air register mounted in the floor of the automobile, Figure 4 is a bottom plan view thereof, Figure 5 is an end elevational view of the front end or cold air intake end of the heater, and Figure 6 is a transverse sectional view therethrough taken substantially along line 6—6 of Figure 5.

Referring now to the drawings in detail, for the purpose of illustration I have disclosed a preferred embodiment of my invention in which the numeral 5 designates an exhaust manifold for the engine of the automobile and which is provided with an air pipe 6 extending longitudinally therethrough in spaced relation from the walls of the manifold 5.

The forward end of the pipe 6 opens outwardly through the forward end of the exhaust manifold, the open end of the pipe being provided with a cover or door 7 having its opposite side edges slidably disposed in a pair of guides 8 formed on the outer end of the manifold.

The door 7 is formed with a vertically extending slotted opening 9 within which is inserted a set screw 10 with its inner end threadedly engaged in a boss 11 formed at the inner upper edge of the pipe 6.

The door 7 is adapted to be manually moved in a vertical direction in the guides 8 so as to control the admission of fresh air into the open end of the pipe 6.

The rear end of the pipe 6 extends laterally through one of the rear walls of the manifold and terminates in a flanged end 12 to which is bolted a similar flanged end 13 of a pipe 14 formed on a register 15.

The register 15 is secured about the edges of an opening formed in the floor board 16 of the automobile and is constructed of the usual grille work 17, well known in the art.

An opening 18 is formed in the bottom wall of the pipe section 14 of the register and adjacent the rear edge of said opening is mounted a pivot pin 19 upon which is pivotally supported a swinging valve 20 adapted for swinging movement inwardly of the opening 18 into the interior of the pipe 14 whereby to selectively control communication through the pipe or through the opening upon the actuation of the valve.

The manner in which the valve serves to close the pipe 14 and permit the discharge of the air from the pipe 6 to the opening 18 is illustrated by the dotted lines in Figure 2 of the drawing and the manner in which the valve closes the opening 18 and permitting the passage of the air to the pipe 14 is illustrated in full lines.

To the pivoted edge of the valve 20 is fixedly secured one end of an arm 21 extending downwardly from the pipe 14 to the lower end of which is attached one end of a link 22 extending rearwardly parallel to the pipe 14 and with its rear end attached to one end of a pivoted lever 23.

The lever 23 is pivoted intermediate its ends at one edge of the register 15 and with its free end disposed above the register to form an operating handle 24. To one end of the pivot pin 19 and extending in a direction opposite from the arm 21, is a crank arm 25 with a projection 26 extending at right angles from one side thereof at the free end of the arm, said projection being pivotally carried by said arm.

The projection 26 is formed with an opening through which a rod 27 is inserted, said rod having one end fixedly attached to a pin 28 pivotally supported at one side of the pipe 14.

A coil spring 29 is compressed on the rod 27 between the projection 26 and the pin 28 and is adapted to secure the pivot pin 19 against accidental movement with the valve 20 in either of its opposite positions.

It is obvious that my invention is susceptible to various changes and modifications in construction without departing from the spirit of the invention or the scope of the appended claim, and I accordingly claim all such forms of the device to which I am entitled.

Having thus described my invention what I claim as new is:

Valve control means for a hot air register comprising a valve pivotally attached to the register feed pipe for controlling communication therethrough, a shaft journaled in the pipe for said valve, levers extending laterally from opposite sides of the shaft, a projection pivotally carried by one of the levers and disposed parallel to the shaft, a rod pivotally carried by the pipe with one end slidably inserted through the projection, spring means mounted on the rod and engaging the projection whereby to yieldably retain the valve in either an open or closed position and an operating lever and a link operatively connecting the last named lever with the other of said first named levers.

In testimony whereof I affix my signature.

PARK BUEL KELLOGG.